Nov. 9, 1926.
A. C. E. MEIER
WINDOW CLEANER
Filed June 13, 1925
1,606,653
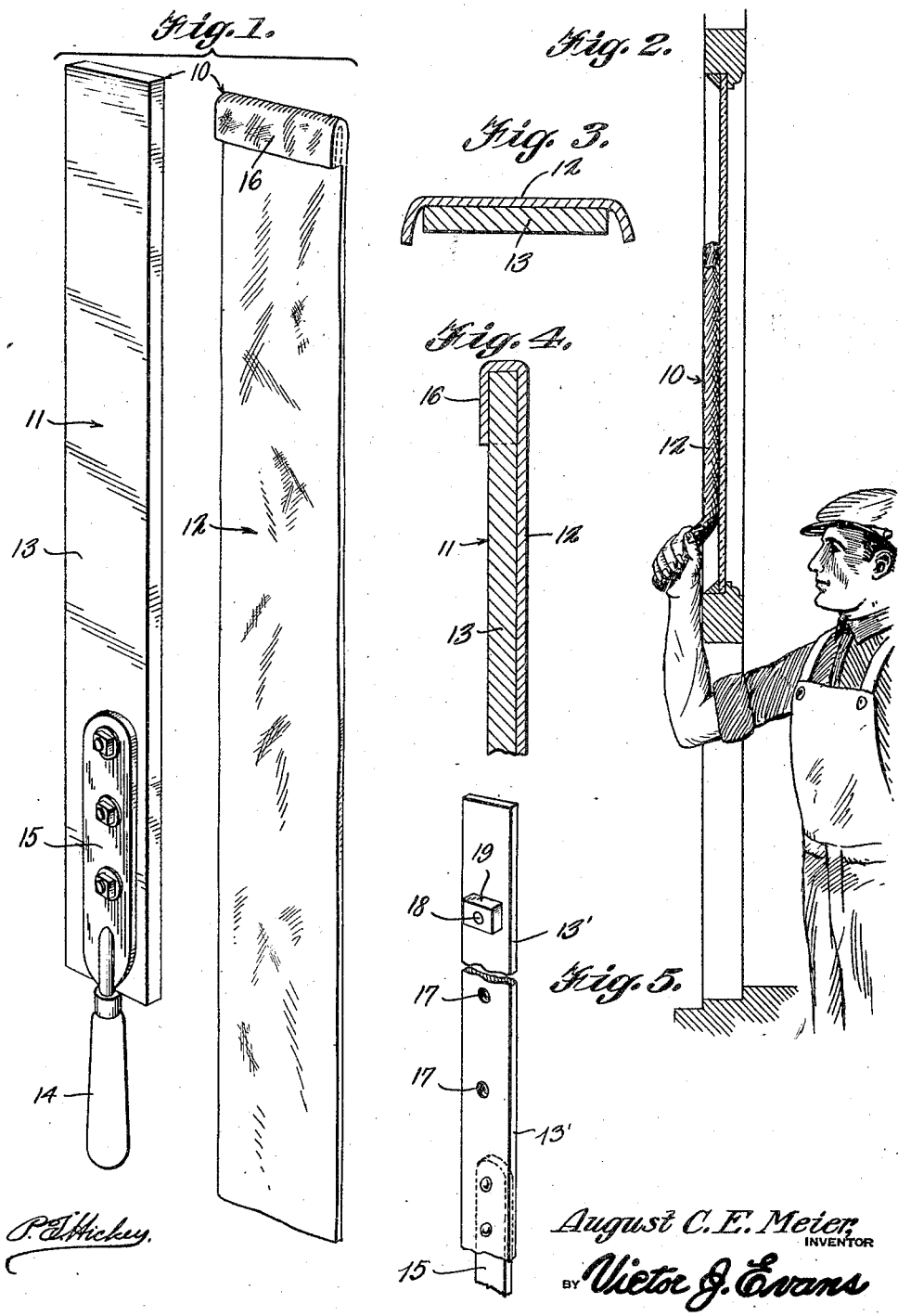
August C. E. Meier,
INVENTOR Patented Nov. 9, 1926.

1,606,653

UNITED STATES PATENT OFFICE.

AUGUST C. E. MEIER, OF NEW YORK, N. Y.

WINDOW CLEANER.

Application filed June 13, 1925. Serial No. 36,905.

This invention relates to improvements in window cleaners and has for its primary object, the provision of a device to enable the outer surface of window panes to be thoroughly cleaned by persons on the inside of a building, whereby to eliminate the risk of injury of sitting or standing upon a window sill for this purpose.

Another object of the invention is to provide a window cleaner having a flexible handle adapted to be gripped by the hand of the operator and which is capable of movement to various angular positions with respect to the wiper, to permit the wiper to rest flat against the surface of the window glass with sufficient pressure which is caused by the flexing of the handle.

A further object is the provision of a window cleaner which includes a rapid means for the removal of the cleaning pad or wiper when it is desired to replace the same, or for changing from a wet pad to a dry pad for thoroughly polishing the window glass after the dirt has been removed therefrom.

A still further object resides in a window cleaner which is simple in construction, cheap of manufacture and easy of operation.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my improved window cleaner with the parts in separated position.

Figure 2 is a vertical sectional view through a window sash showing the manner of cleaning the outer surface of the window glass.

Figure 3 is a horizontal sectional view through the window cleaner.

Figure 4 is a detail vertical sectional view through the upper end of the wiper.

Figure 5 is a detail view of a slight modified form.

Referring more particularly to the drawing, the reference numeral 10 designates my improved window cleaning implement in its entirety and which includes a holder 11 and a wiper 12.

The holder 11 comprises a flat elongated body member 13 of rigid material and to one end of which a handle 14 is flexibly connected by a bendable springy plate 15.

The wiper 12 is in the nature of a strip of cloth adapted to overlie one of the faces of the body member 13, and is of a length greater than the body member, so as to extend over the handle 14. The upper end of the wiper is provided with a pocket 16 which receives the outer end of the body member, and when in use, the lower end of the wiper is gripped about the handle 14 by the hand of the operator, and the wiper held taut over the holder at all times during the cleaning operation.

In practice, the wiper is applied to the holder in the manner above mentioned, and the device placed against the outer face of the window glass as shown in Figure 2 of the drawing. The flexible handle 14 permits angular adjustment of the same so as not to cramp the arm of the operator when in use. The handle is adapted to be flexed to that particular position most comfortable to the operator to allow an easy and natural movement of the cleaner over the window glass. When the device is positioned against a window glass with the handle flexed, it will be seen that pressure is automatically applied to the holder which causes the wiper to lie flat against the glass to be cleaned. In operation, the implement may be drawn horizontally from one side of the window to the other, or a circular movement may be applied thereto. However, the operation is optional with the operator and different movements of the device may be necessary for the accommodation of different style windows.

In Figure 5 of the drawing, I have shown a slightly modified form of holder for use in cleaning sashes made up of a plurality of small window glasses, which necessitates cross bars within the sash. In this form, the body member 13' is provided with spaced threaded openings 17. A clamping screw 18 passes through a block 19 and is adapted to be threaded into any of the openings for removably clamping the block to the body member. The wiper is applied in the some manner as above mentioned, but the block spaces a portion of the same from the body member to allow the wiper to reach the glass, between the cross bars.

From the foregoing description, it will be seen that I have provided a cleaning implement in which the wiper may be quickly removed and which does not require any mechanical clamping means to support the same upon the holder. The implement permits the easy cleaning of the outside of the window glasses from within a building, thus eliminating the danger of falling from the window when sitting or standing upon the window sill and which is at present the method employed for reaching the outside of the glasses.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A window cleaning implement comprising an elongated member, a handle flexibly connected to one end of said member, and a wiper having a pocket at one end thereof for receiving the outer end of said member, the other end of said wiper extending below said member and adapted to be held about said handle by the hand of an operator.

2. A window cleaner comprising a rigid elongated member, a handle, and a spring means connecting said handle with one end of said member for normally holding said handle in parallel relation to the length of said member and for permitting said handle to be flexed to different angular positions with respect to said member, and a wiping cloth having a pocket at one end thereof to receive the free end of said member, the other end of said cloth adapted to be wrapped about said handle and held by the hand of the operator.

In testimony whereof I have affixed my signature.

AUGUST C. E. MEIER